United States Patent
Nishikawa

(10) Patent No.: US 9,985,677 B2
(45) Date of Patent: May 29, 2018

(54) INFORMATION PROCESSING DEVICE

(71) Applicant: Panasonic Intellectual Property Management Co., Ltd., Osaka (JP)

(72) Inventor: Kenji Nishikawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 34 days.

(21) Appl. No.: 14/423,143

(22) PCT Filed: Jul. 1, 2014

(86) PCT No.: PCT/JP2014/003483
§ 371 (c)(1),
(2) Date: Feb. 23, 2015

(87) PCT Pub. No.: WO2015/029298
PCT Pub. Date: Mar. 5, 2015

(65) Prior Publication Data
US 2016/0254831 A1 Sep. 1, 2016

(30) Foreign Application Priority Data

Sep. 2, 2013 (JP) .................................. 2013-181078

(51) Int. Cl.
*H04B 1/3827* (2015.01)
*H04W 52/38* (2009.01)
(Continued)

(52) U.S. Cl.
CPC ......... *H04B 1/3838* (2013.01); *H04B 17/102* (2015.01); *H04W 52/283* (2013.01);
(Continued)

(58) Field of Classification Search
CPC .............................. H04B 1/3838; H04W 52/30
See application file for complete search history.

(56) References Cited

U.S. PATENT DOCUMENTS 7,146,139 B2    12/2006  Nevermann
8,620,245 B2 *  12/2013  Chung ................... H01Q 1/243
                                                        375/267

(Continued)

FOREIGN PATENT DOCUMENTS

EP    2 787 780    10/2014
JP    4227386      2/2009
(Continued)

OTHER PUBLICATIONS

International Search Report dated Oct. 7, 2014 in International (PCT) Application No. PCT/JP2014/003483.
(Continued)

*Primary Examiner* — Magdi Elhag
(74) *Attorney, Agent, or Firm* — Wenderoth, Lind & Ponack, L.L.P.

(57) ABSTRACT

An information processing device of the present disclosure includes a processor, a power source that supplies power, a proximity sensor that detects approach of an object, and an antenna that outputs an electromagnetic wave. The processor sets a maximum power of the electromagnetic wave from the antenna to a first value after the power source starts supplying the power, and then sets the maximum power of the electromagnetic wave from the antenna to a second value greater than the first value when the proximity sensor no longer detects approach of an object that has once been detected by the proximity sensor.

6 Claims, 5 Drawing Sheets

(51) Int. Cl.
*H04W 52/36* (2009.01)
*H04W 52/30* (2009.01)
*H04W 52/28* (2009.01)
*H04B 17/10* (2015.01)

(52) U.S. Cl.
CPC ......... *H04W 52/30* (2013.01); *H04W 52/367* (2013.01); *H04W 52/38* (2013.01)

(56) References Cited

U.S. PATENT DOCUMENTS

| | | | | |
|---|---|---|---|---|
| 8,766,852 | B2* | 7/2014 | Hwang | H04B 1/3838 342/374 |
| 2003/0064761 | A1* | 4/2003 | Nevermann | H04B 1/3838 455/572 |
| 2004/0212515 | A1* | 10/2004 | Eaton | H04B 1/3838 340/870.07 |
| 2009/0069050 | A1* | 3/2009 | Jain | G06K 19/07739 455/558 |
| 2009/0131124 | A1* | 5/2009 | Bibaud | H04M 1/6066 455/575.2 |
| 2009/0305742 | A1 | 12/2009 | Caballero et al. | |
| 2010/0279751 | A1* | 11/2010 | Pourseyed | H01Q 1/2258 455/575.7 |
| 2011/0134004 | A1 | 6/2011 | Takatsuka et al. | |
| 2011/0250928 | A1* | 10/2011 | Schlub | H01Q 1/243 455/550.1 |
| 2012/0050331 | A1* | 3/2012 | Kanda | G06F 3/1454 345/649 |
| 2012/0062424 | A1* | 3/2012 | Hwang | H04B 1/3838 342/374 |
| 2012/0214412 | A1* | 8/2012 | Schlub | G01B 7/023 455/41.1 |
| 2013/0045697 | A1* | 2/2013 | Cheng | H04B 1/3838 455/95 |
| 2013/0172045 | A1 | 7/2013 | Caballero et al. | |
| 2013/0335258 | A1* | 12/2013 | Chung | H04B 1/3838 342/27 |

FOREIGN PATENT DOCUMENTS

| | | |
|---|---|---|
| JP | 2011-102787 | 5/2011 |
| JP | 2011-124685 | 6/2011 |
| JP | 2011-526099 | 9/2011 |
| WO | 2009/149023 | 12/2009 |
| WO | 2013/117040 | 8/2013 |

OTHER PUBLICATIONS

Extended European Search Report dated Sep. 5, 2016 in European Application No. 14837094.3.

* cited by examiner

INFORMATION PROCESSING DEVICE

TECHNICAL FIELD

The present disclosure relates to an information processing device having a proximity sensor.

BACKGROUND ART

PTL 1 discloses a proximity sensor. The disclosed proximity sensor determines whether a detected object exists or not during a first time period T1, and determines whether an extraneous radio wave exists or not during a second time period T2. This prevents malfunction due to an extraneous radio wave, with a simple circuit configuration.

CITATION LIST

Patent Literature

PTL 1: Unexamined Japanese Patent Publication No. 2011-102787

SUMMARY OF THE INVENTION

The present disclosure provides an information processing device that reduces the possibility of emission of an electromagnetic wave that may affect a user.

The information processing device according to the present disclosure includes a processor, a power source configured to supply power, a proximity sensor configured to detect approach of an object, and an antenna configured to output an electromagnetic wave. The processor sets a maximum power of the electromagnetic wave from the antenna to a first value after the power source starts supplying the power, and then sets the maximum power of the electromagnetic wave from the antenna to a second value greater than the first value when the proximity sensor no longer detects approach of an object that has once been detected by the proximity sensor.

This configuration is advantageous in reducing the possibility of emission of an electromagnetic wave that affects the user.

DESCRIPTION OF EMBODIMENT

An exemplary embodiment will be described below in detail with reference to the drawings as appropriate. Note that description in excessive detail may be omitted. For example, detailed description of a well-known subject and duplicate description of substantially the same configuration may be omitted. The aim of this is to avoid unnecessary redundancy in the following description, and thus to facilitate understanding of those skilled in the art.

Note that the attached drawings and the following description are provided for those skilled in the art to fully understand the present disclosure, and are not intended to limit the subject matter as described in the appended claims.

Exemplary Embodiment

An exemplary embodiment will be described below with reference to FIGS. 1 to 5.

(1-1-1. Configuration of Information Processing Device)

Figure 1:
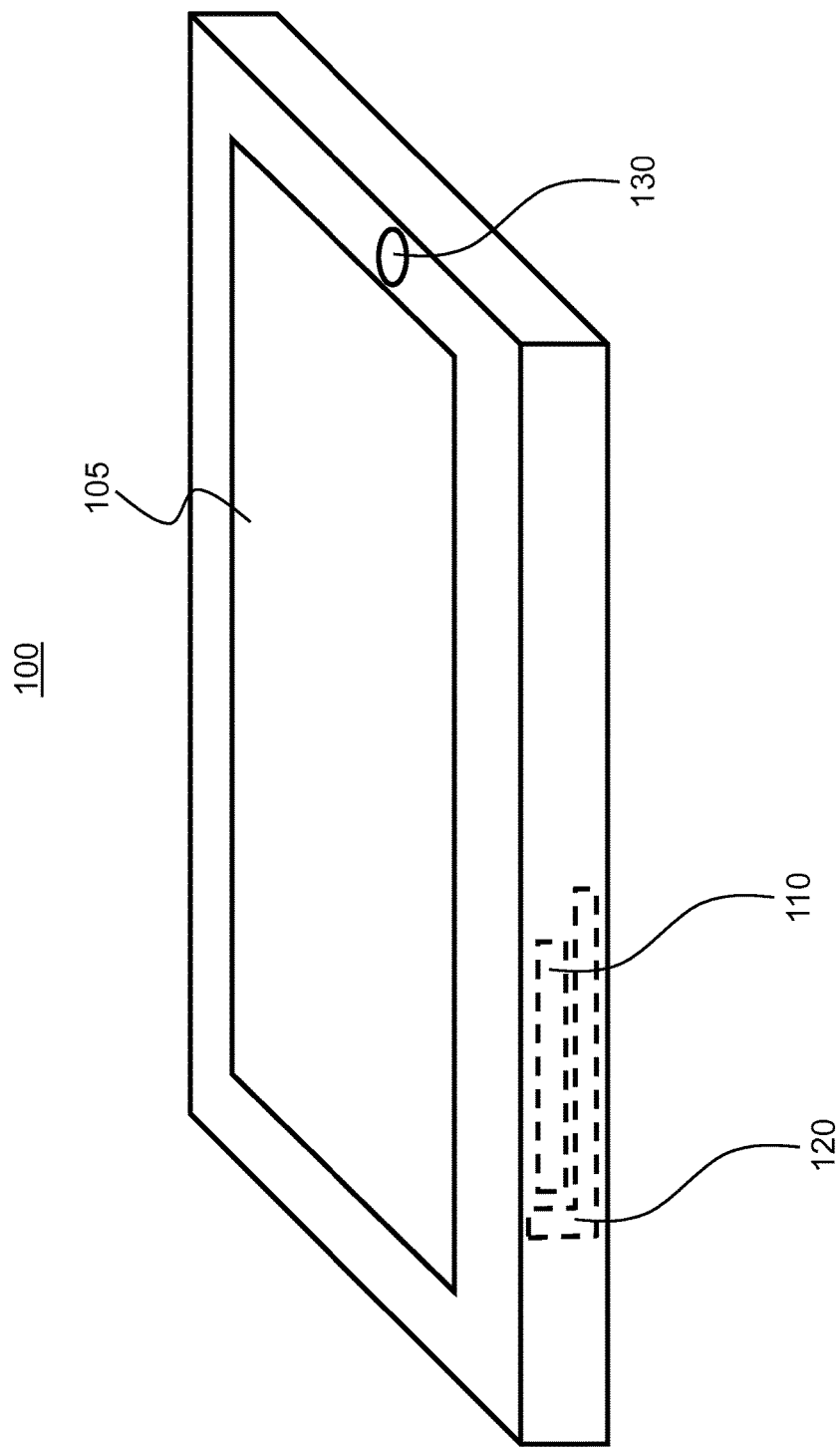
FIG. 1 is a diagram illustrating a configuration of an information processing device according to an exemplary embodiment.

FIG. 1 is a diagram illustrating a configuration of an information processing device according to this exemplary embodiment.

In this exemplary embodiment, information processing device 100 is described as a tablet personal computer.

Note that a tablet personal computer is merely by way of example, and thus information processing device 100 may also be a convertible PC (Personal Computer), a clamshell PC, a smart phone, or the like.

Information processing device 100 performs various information processing, and displays a result thereof on display portion 105.

Figure 3:
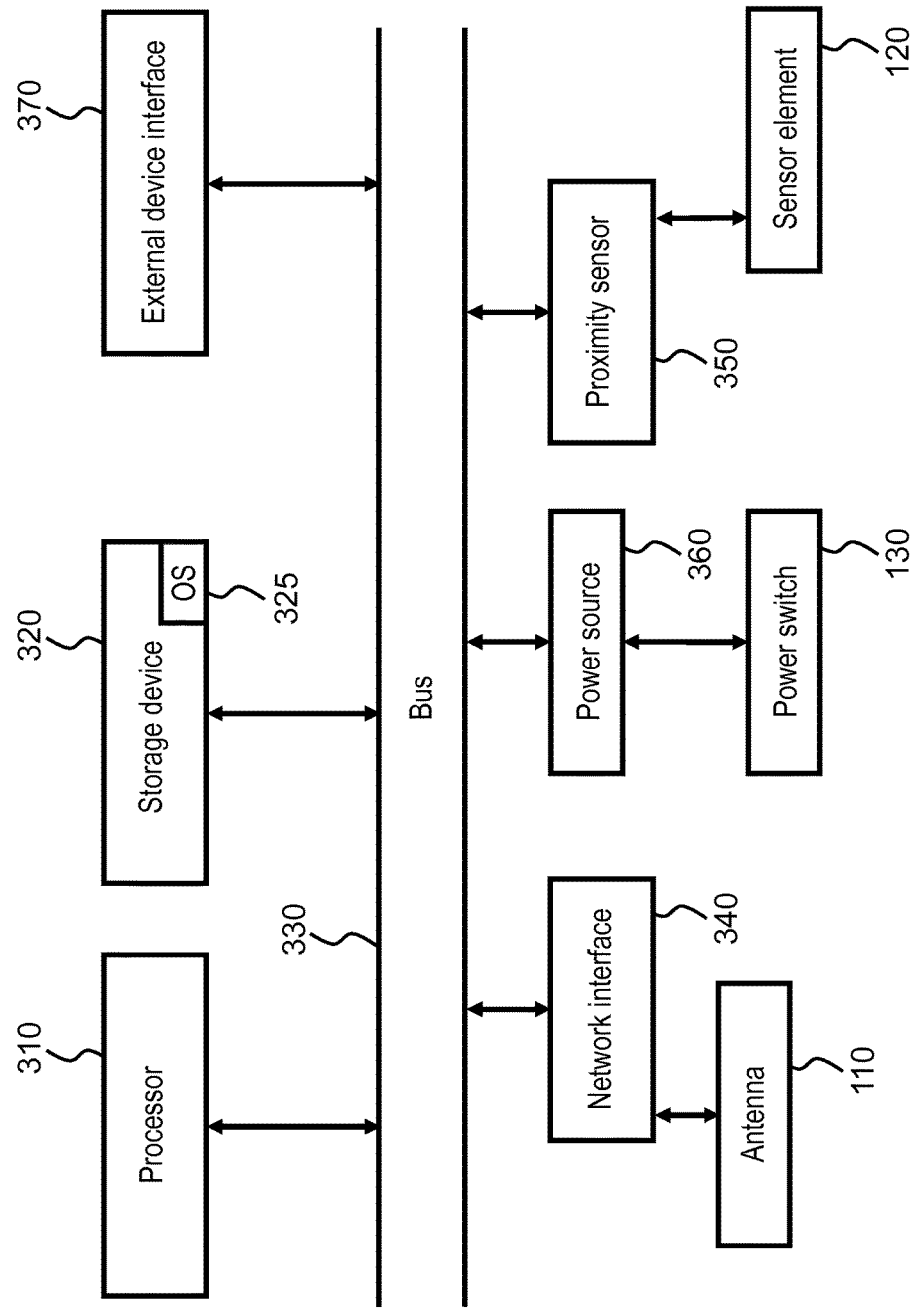
FIG. 3 is a block diagram of the information processing device according to the exemplary embodiment.

Display portion 105 is disposed on a main face of information processing device 100. Display portion 105 is formed of, for example, a liquid crystal display. Information processing device 100 performs predetermined information processing based on OS (Operating System) 325 (FIG. 3).

Antenna 110 emits electromagnetic waves in various frequency ranges into space, and receives electromagnetic waves from space. Information processing device 100 has, at one side surface, antenna 110 inside. Antenna 110 is formed of, for example, a metallic pattern printed on a substrate disposed inside information processing device 100. Information processing device 100 performs wireless data communication using an electromagnetic wave emitted from antenna 110.

Sensor element 120 is a proximity sensor, and detects an object including a human body. In this exemplary embodiment, information processing device 100 has sensor element 120 disposed inside at the same surface in the same manner as antenna 110. In this exemplary embodiment, sensor element 120 is disposed near antenna 110. In this exemplary embodiment, sensor element 120 has an "L" shape, disposed so as to have antenna 110 in the concave region of the "L" shape. Disposing sensor element 120 around antenna 110 allows sensor element 120 to detect that an object has approached a vicinity of antenna 110.

Sensor element 120 is formed of, for example, a metallic pattern printed on a substrate disposed inside information processing device 100. Information processing device 100 changes a maximum power of the electromagnetic wave emitted from antenna 110 depending on a status of detection by sensor element 120 of approach of an object. More specifically, information processing device 100 changes the maximum power of the electromagnetic wave emitted from antenna 110 between two modes which are a power down mode and a normal mode. In the power down mode, the maximum power of an electromagnetic wave, which is an output emitted from antenna 110, is limited to a value that satisfies a SAR (Specific Absorption Rate) regulation during approach of an object. In the normal mode, the maximum power of an electromagnetic wave, which is an output emitted from antenna 110, is higher than a value that satisfies the SAR regulation, and is in a range of possible values of network interface 340.

Power switch 130 is disposed on a main face of information processing device 100. When power switch 130 is pushed, information processing device 100 is powered on and is started.

(1-1-2. Configuration of External Device)

Figure 2:
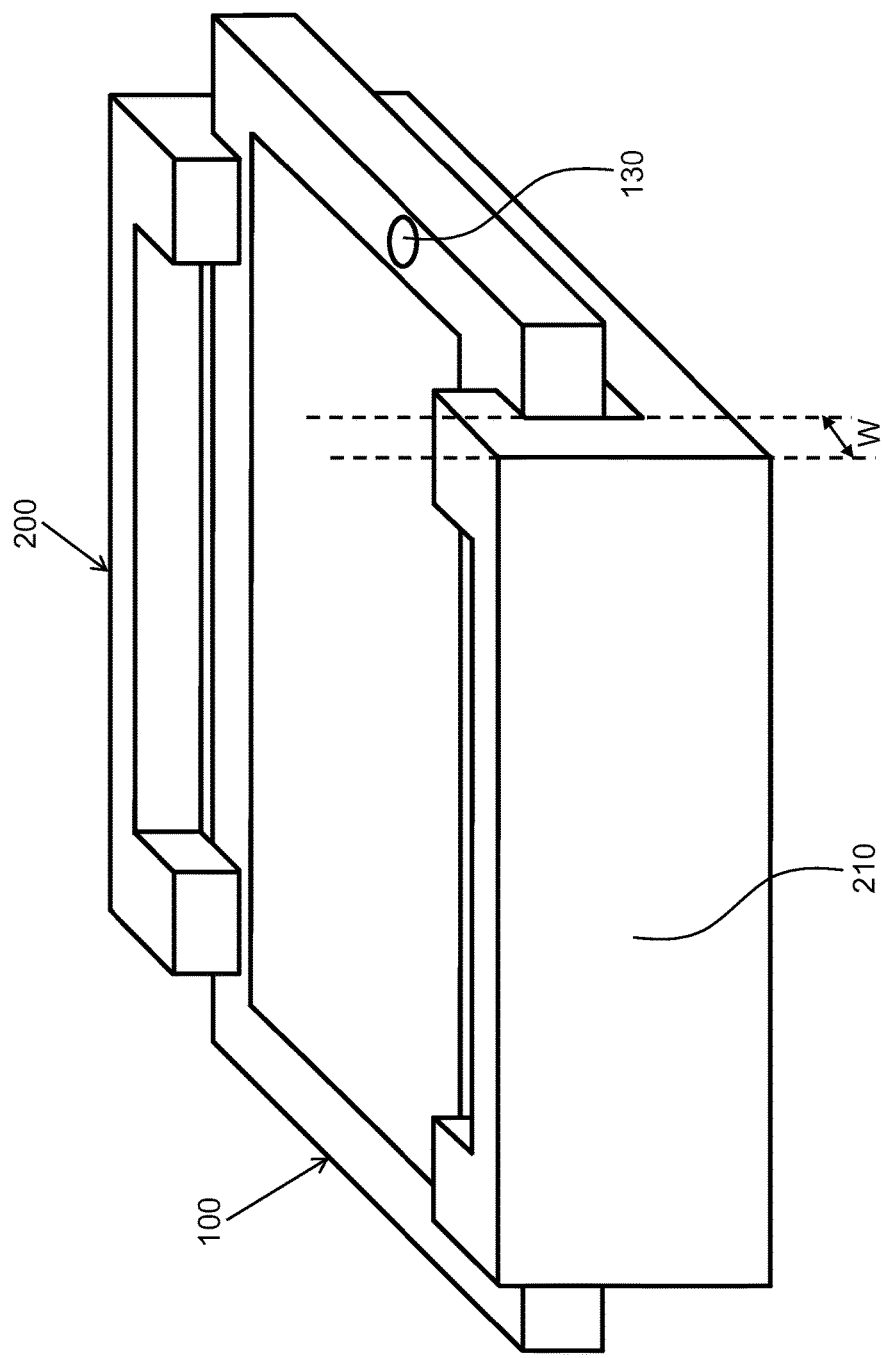
FIG. 2 is a perspective view of the information processing device according to the exemplary embodiment connected to an external device.

Information processing device 100 may be connected to an external device for use. Referring to FIG. 2, a configuration of one example to use information processing device 100 connected to an external device will be described.

FIG. 2 is a perspective view of information processing device 100 according to this exemplary embodiment connected to an external device.

In this exemplary embodiment, external device 200 is described as a car dock that is used when information processing device 100 is provided in a vehicle.

Information processing device 100 is attached to external device 200. External device 200 and information processing device 100 respectively have dedicated external device interfaces (not shown), and are thus electrically connected to each other via the dedicated external device interfaces when information processing device 100 is attached to external device 200.

External device 200 is secured so as to cover antenna 110 and sensor element 120 of information processing device 100.

External device 200 has outer frame 210 having a predetermined thickness W of, for example, 2 cm. Outer frame 210 covers antenna 110 and sensor element 120.

(1-1-3. Block Configuration of Information Processing Device)

FIG. 3 is a block diagram of information processing device 100 according to this exemplary embodiment.

Processor 310 executes a program stored in storage device 320, and thereby controls information processing device 100. By executing the program, processor 310 controls other components of information processing device 100.

In the present disclosure, the term processor 310 is intended to include any and all components having a function to process an information signal. In this exemplary embodiment, components each having a comparable function to that of processor 310, for example a network interface or the like, are described as separate components from processor 310. However, such components may be disposed integrally and physically inside processor 310 in a single package, or may be disposed individually as in this exemplary embodiment.

Storage device 320 temporarily or permanently stores data required for processing in information processing device 100. For example, storage device 320 stores OS 325, programs, and the like. Storage device 320 is implemented by a volatile memory, a nonvolatile memory, an HDD (Hard Disk Drive), or the like.

An electrical signal transmitted and received by other components of information processing device 100 passes through bus 330. Control signals and data are transmitted and received between components of information processing device 100 via bus 330.

Network interface 340 establishes and disconnects a connection with a network, and acquires information on the network. Network interface 340 is controlled by processor 310. Network interface 340 processes a signal used for communication using a predetermined communication scheme. Network interface 340 is connected to antenna 110. Network interface 340 is controlled by processor 310 to control the output of antenna 110.

Proximity sensor 350 detects whether any object is approaching antenna 110 or not based on a signal transmitted from sensor element 120. Proximity sensor 350 includes, for example, a circuit to detect a change in an electrical status of sensor element 120. Proximity sensor 350 is connected to sensor element 120. Proximity sensor 350 converts a signal transmitted from sensor element 120 into approach detection information that is processable by processor 310. Approach detection information differentiates between an "approach is detected" situation and an "approach is not detected" situation. Approach detection information is notified to processor 310.

Proximity sensor 350 may be included in processor 310, and implemented as a function of processor 310, or may be included in sensor element 120, and implemented as a function of sensor element 120.

Power source 360 supplies power to information processing device 100. The power supply of power source 360 is controlled by power switch 130.

External device interface 370 is an interface that detects connection of external device 200 to information processing device 100. Connection status information that indicates whether external device 200 is connected or not is notified to processor 310 via external device interface 370.

(1-2. Operation)

An operation of information processing device 100 will next be described below. More specifically, an operation will be described from a power-on of information processing device 100 until a transition, to the normal mode, of the maximum power of the electromagnetic wave emitted from antenna 110. Information processing device 100 changes the value of the maximum power of the electromagnetic wave emitted from antenna 110 depending on the status of detection by antenna 110 of the approach of an object.

Figure 4:
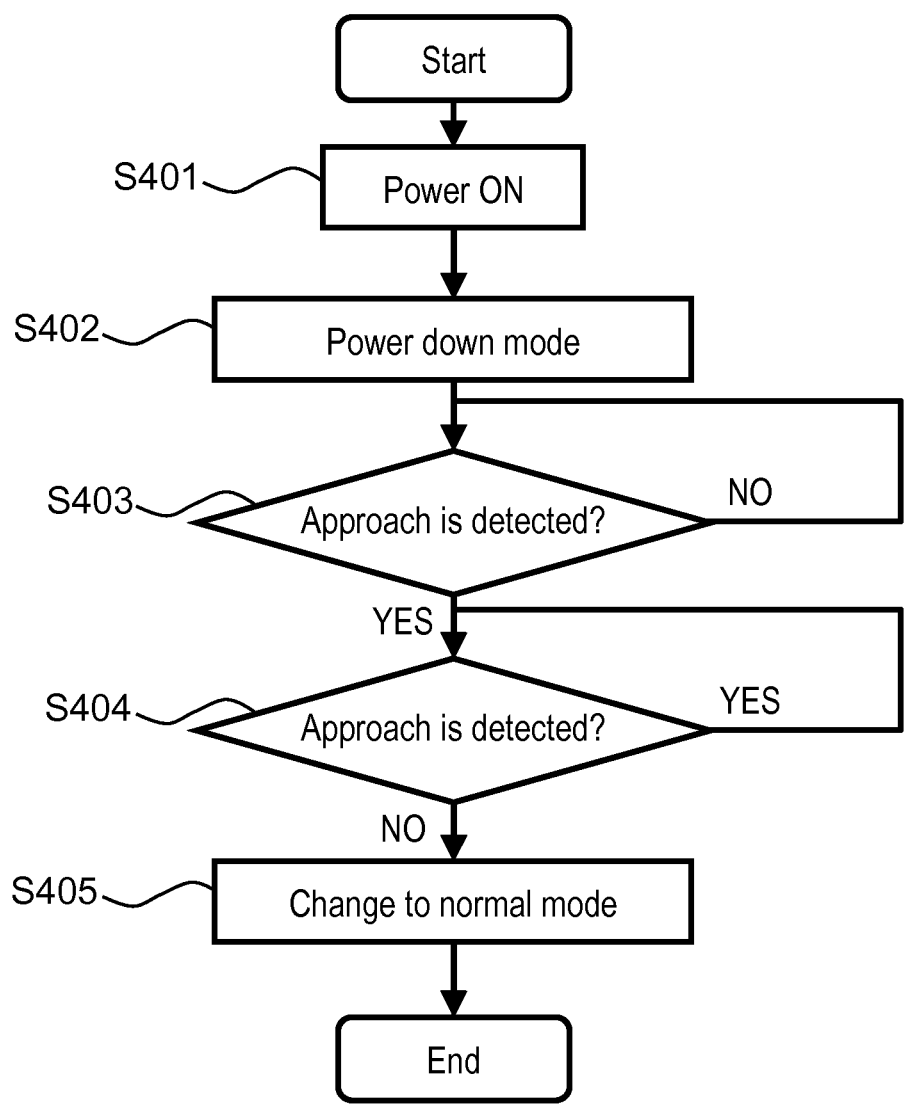
FIG. 4 is a flowchart illustrating a method of controlling the maximum power of an electromagnetic wave emitted from an antenna when power is supplied to the information processing device according to the exemplary embodiment.

FIG. 4 is a flowchart illustrating a method of controlling the maximum power of an electromagnetic wave emitted from antenna 110 when power is supplied to information processing device 100, according to this exemplary embodiment.

(S401) An operation of power switch 130 causes power source 360 to supply power to each of the components of information processing device 100.

(S402) Processor 310 activates network interface 340 in the power down mode. In the power down mode, the maximum power of the electromagnetic wave emitted from antenna 110 is at a value that satisfies the SAR regulation.

(S403) Processor 310 acquires approach detection information from sensor element 120 via proximity sensor 350. If the approach detection information indicates "approach is detected" (YES), the process proceeds to S404, whereas if the approach detection information indicates "approach is not detected" (NO), the process repeats step S403.

(S404) Processor 310 acquires approach detection information from sensor element 120 via proximity sensor 350. If the approach detection information indicates "approach is detected" (YES), the process repeats step S404, whereas if the approach detection information indicates "approach is not detected" (NO), the process proceeds to S405.

(S405) Processor 310 changes network interface 340 to the normal mode. In the normal mode, antenna 110 outputs an electromagnetic wave so that the maximum power of the electromagnetic wave emitted from antenna 110 is higher than a value that satisfies the SAR regulation, and is in a range of possible values of network interface 340. That is, the output of antenna 110 exceeds a value that satisfies the SAR regulation.

After changing network interface 340 to the normal mode, processor 310 changes the maximum power of the electromagnetic wave emitted from antenna 110 depending on the status of detection by sensor element 120 of approach of an object.

As described above, when information processing device 100 is powered on, network interface 340 is activated in the power down mode. Detection by proximity sensor 350 that no objects are approaching after the detection of approach of the object confirms a transition of the status of detection by proximity sensor 350 of the object. A transition of the status of detection by proximity sensor 350 of the object can lead to the determination that proximity sensor 350 is not in failure. After confirming that proximity sensor 350 is not in failure, processor 310 changes network interface 340 to the normal mode.

The operation described above can reduce the possibility of outputting an electromagnetic wave, higher than a value that satisfies the SAR regulation, toward the user of information processing device 100.

Next, a description will be made regarding a method of controlling the maximum power of an electromagnetic wave emitted from antenna 110 of information processing device 100 in consideration of use of information processing device 100 attached to external device 200.

External device 200 has outer frame 210 having a predetermined thickness W of, for example, 2 cm. Since outer frame 210 covers antenna 110 and sensor element 120, the maximum power of an electromagnetic wave emitted from antenna 110 remains at a value that satisfies the SAR regulation even when network interface 340 is in the normal mode.

Figure 5:
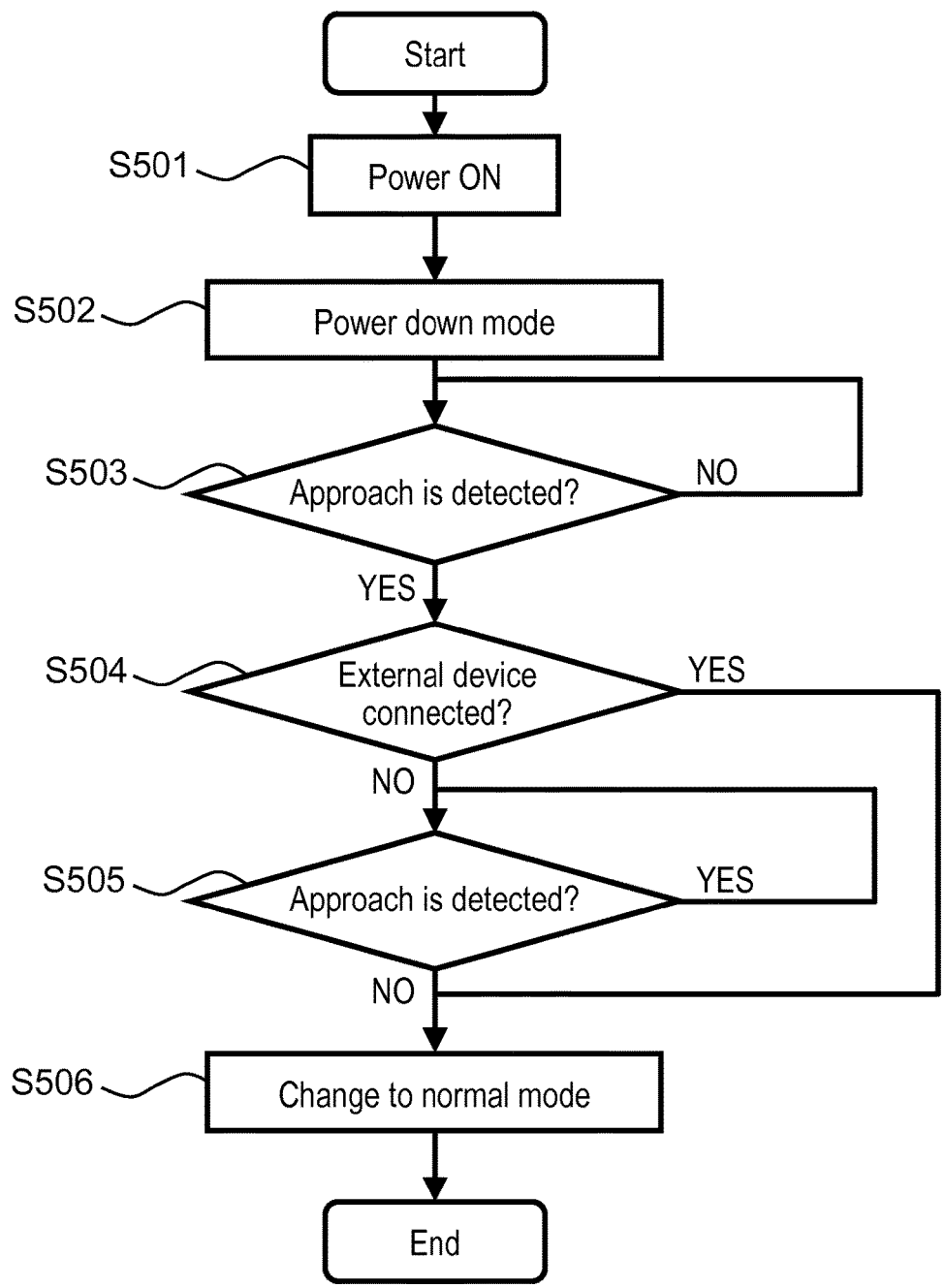
FIG. 5 is a flowchart illustrating another method of controlling the maximum power of an electromagnetic wave emitted from an antenna when power is supplied to the information processing device according to the exemplary embodiment.

FIG. 5 is a flowchart illustrating another method of controlling the maximum power of an electromagnetic wave emitted from antenna 110 when power is supplied to information processing device 100, according to this exemplary embodiment.

(S501) An operation of power switch 130 causes power source 360 to supply power to each of the components of information processing device 100.

(S502) Processor 310 activates network interface 340 in the power down mode. In the power down mode, the maximum power of the electromagnetic wave emitted from antenna 110 is at a value that satisfies the SAR regulation.

(S503) Processor 310 acquires approach detection information from sensor element 120 via proximity sensor 350. If the approach detection information indicates "approach is detected" (YES), the process proceeds to S504, whereas if the approach detection information indicates "approach is not detected" (NO), the process repeats step S503.

(S504) Processor 310 acquires the connection status of external device 200 via external device interface 370. If the connection status indicates that external device 200 is connected to information processing device 100 (YES), the process proceeds to S506, whereas if the connection status indicates that external device 200 is not connected to information processing device 100 (NO), the process proceeds to S505.

(S505) Processor 310 acquires approach detection information from sensor element 120 via proximity sensor 350. If the approach detection information indicates "approach is detected" (YES), the process repeats step S505, whereas if the approach detection information indicates "approach is not detected" (NO), the process proceeds to S506.

(S506) Processor 310 changes network interface 340 to the normal mode. In the normal mode, antenna 110 outputs an electromagnetic wave so that the maximum power of the electromagnetic wave emitted from antenna 110 is higher than a value that satisfies the SAR regulation, and is in a range of possible values of network interface 340. That is, the output of antenna 110 exceeds a value that satisfies the SAR regulation.

After changing network interface 340 to the normal mode, processor 310 changes the maximum power of the electromagnetic wave emitted from antenna 110 depending on the status of detection by sensor element 120 of the approach of an object.

As described above, when information processing device 100 is powered on, network interface 340 is activated in the power down mode. When information processing device 100 is attached to external device 200, proximity sensor 350 no more detects approach of an object after the detection of approach of the object. In addition, external device 200 is the only object that approaches proximity sensor 350. Accordingly, processor 310 can change network interface 340 to the normal mode irrespective of whether proximity sensor 350 is in failure or not. When information processing device 100 is not attached to external device 200, similarly to the case of FIG. 4, detection by proximity sensor 350 that no objects are approaching after the detection of approach of the object confirms a transition of the status of detection by proximity sensor 350 of the object. A transition of the status of detection by proximity sensor 350 of the object can lead to the determination that proximity sensor 350 is not in failure. After confirming that proximity sensor 350 is not in failure, processor 310 changes network interface 340 to the normal mode.

The operation described above can reduce the possibility of outputting an electromagnetic wave, higher than a value that satisfies the SAR regulation, toward the user of information processing device 100.

(1-3. Advantages and Others)

As described above, in this exemplary embodiment, information processing device 100 includes processor 310, power source 360 that supplies power, proximity sensor 350 that detects approach of an object, and antenna 110 that outputs an electromagnetic wave. Processor 310 sets a maximum power of the electromagnetic wave from antenna 110 to a first value after power source 360 starts supplying the power, and then sets the maximum power of the electromagnetic wave from antenna 110 to a second value greater than the first value when the proximity sensor 350 no longer detects approach of an object that has once been detected by the proximity sensor 350.

This configuration provides control in which, after information processing device 100 is powered on, the approach status information indicates "approach is detected" and then "approach is not detected" after which antenna 110 outputs an output at a second value greater than the first value that satisfies the SAR regulation. A transition of the approach status information on detection by proximity sensor 350 to one indicating "approach is detected" and then to one indicating "approach is not detected" demonstrates a high likelihood that proximity sensor 350 and sensor element 120 are not in failure, but operate normally. Therefore, after confirmation that proximity sensor 350 and sensor element 120 are not in failure, but operate normally, antenna 110 changes its output to a second value greater than the first value that satisfies the SAR regulation. In other words, if information processing device 100 determines that proximity sensor 350 or sensor element 120 is in failure, antenna 110 cannot output an output at a second value greater than the first value that satisfies the SAR regulation. Thus, this operation can reduce the possibility of emission of an electromagnetic wave that affects the user close to information processing device 100.

In addition, in this exemplary embodiment, when information processing device 100 is attached to external device 200 such that proximity sensor 350 and antenna 110 are covered, processor 310 sets the maximum power of the electromagnetic wave from antenna 110 to the second value after power source 360 starts supplying the power.

When information processing device 100 is attached to external device 200 so that proximity sensor 350 and antenna 110 are covered, the maximum power of the electromagnetic wave from antenna 110 remains at a value that satisfies the SAR regulation even when network interface 340 is in the normal mode. Thus, network interface 340 can be changed to the normal mode irrespective of whether proximity sensor 350 is in failure or not. This can reduce the possibility of outputting an electromagnetic wave, higher than a value that satisfies the SAR regulation, toward the user of information processing device 100, and thereby can improve convenience of information processing device 100.

INDUSTRIAL APPLICABILITY

The present disclosure is applicable to an information processing device having a proximity sensor, and more specifically, to a personal computer, a smart phone, or the like.

REFERENCE MARKS IN THE DRAWINGS 100 information processing device
105 display portion
110 antenna
120 sensor element
130 power switch
200 external device
210 outer frame
310 processor
320 storage device
325 OS
330 bus
340 network interface
350 proximity sensor
360 power source
370 external device interface

The invention claimed is:
1. An information processing device comprising:
a power source configured to supply power;
a proximity sensor configured to detect approach of an object and output a first detection signal and a second detection signal after the first detection signal, each of the first detection signal and the second detection signal representing a status of the object;
an antenna configured to output an electromagnetic wave; and
a processor configured to:
process the first detection signal and the second detection signal;
determine the status of the object with respect to the processed first detection signal and the status of the object with respect to the processed second detection signal;
determine an operational state of the proximity sensor; and
set a power of the electromagnetic wave output by the antenna, wherein
the processor (i) sets the power of the electromagnetic wave to a first value upon the power source starting supplying of the power, (ii) holds the power of the electromagnetic wave at the first value during a time period in which each of the status of the object with respect to the processed first detection signal and the status of the object with respect to the processed second detection signal is determined, and (iii) sets the power of the electromagnetic wave to a second value greater than the first value only after the status of the object with respect to the processed first detection signal is determined to be an approach of the object and the status of the object with respect to the processed second detection signal is determined to be no approach of the object, thereby affirming that the operational state of the proximity sensor is not a state of failure.

2. The information processing device according to claim 1, wherein
when the information processing device is attached to an external device so as to cover the proximity sensor and the antenna, the proximity sensor no longer detects an approach of the object, and the processor sets the power of the electromagnetic wave to the second value after the power source starts supplying the power.

3. The information processing device according to claim 2, further comprising a network interface configured to be operated in a first mode and a second mode.

4. The information processing device according to claim 3, wherein when the information processing device is attached to the external device so that the proximity sensor and the antenna are covered, the power of the electromagnetic wave is capable of satisfying a predetermined specific absorption rate regulation even when the network interface is operated in the second mode.

5. The information processing device according to claim 1, wherein if the status of the object with respect to the processed first detection signal is determined by the processor to be an approach of the object and the status of the object with respect to the processed second detection signal is determined by the processor to be an approach of the object, the processor does not set the power of the electromagnetic wave to the second value.

6. The information processing device according to claim 3, wherein in the first mode, the power of the electromagnetic wave is the first value, and in the second mode, the power of the electromagnetic wave is the second value.

* * * * *